Figure 1:
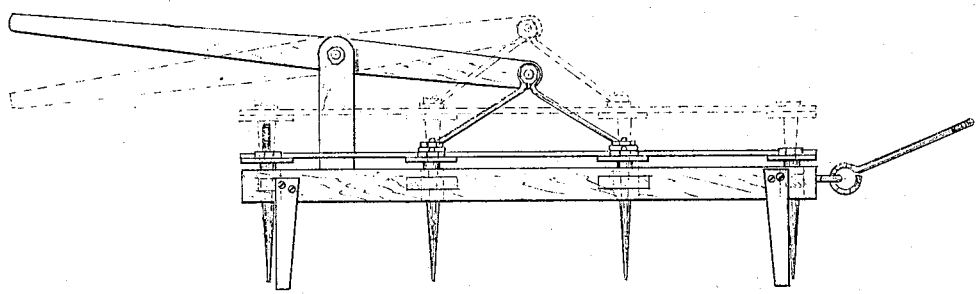
Figure 2:
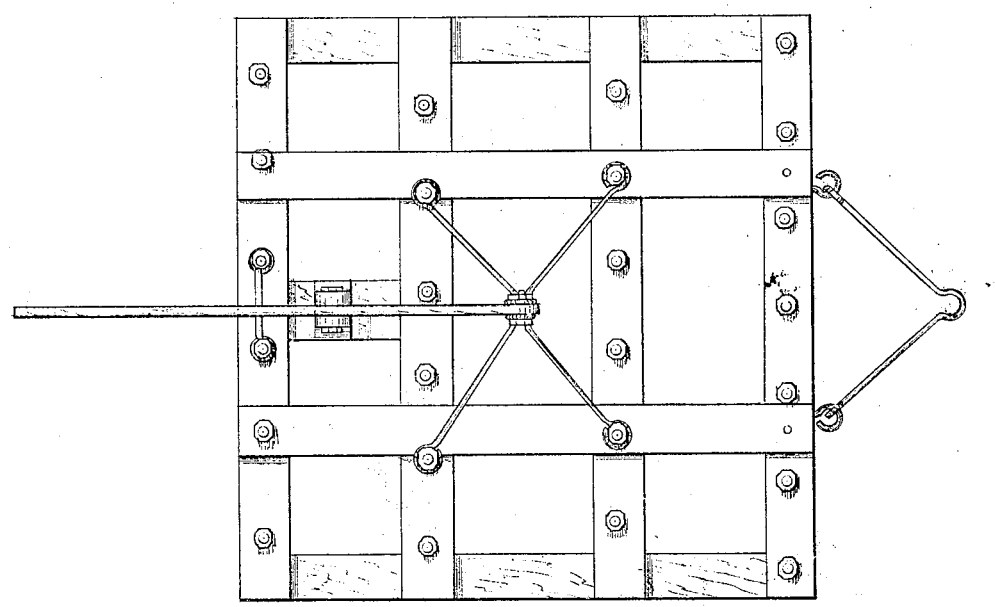

*Thayer & Thomas,*

*Harrow.*

No. 106,742. Patented Aug 23. 1870.

Witnesses:
John H. Miles
Wm. B. Fowler

Inventor:
Cornelius Thayer
Lemon L. Thomas

United States Patent Office.

CORNELIUS THAYER AND LEMAN L. THOMAS, OF OTEGO, NEW YORK.

Letters Patent No. 106,742, dated August 23, 1870.

IMPROVEMENT IN HARROWS.

The Schedule referred to in these Letters Patent and making part of the same

*To all whom it may concern:*

Be it known that we, CORNELIUS THAYER and LEMAN L. THOMAS, of the town of Otego, in the county of Otsego and State of New York, have invented a new and useful Self-cleaning Harrow; and we do declare that the following is a full, clear, and exact description of the construction and operation of the same, reference being had to the annexed drawing making a part of this specification.

Our harrow consists of a skeleton frame made of iron, to which the teeth of the harrow are attached by means of a nut upon the end of every tooth.

This skeleton frame is then attached to the frame of a harrow constructed of wood, through which the teeth of the skeleton-harrow pass freely; a standard and lever are then attached to this wooden frame, and the short end of the lever is connected to the skeleton frame-work containing the teeth, the long end of the lever extending back to the rear of the harrow; the team is attached to the wooden frame, and the driver, by operating the lever with a downward motion, raises the skeleton harrow so far as may be necessary to allow it to pass freely over all obstructions and impediments.

The lever is then released from the driver's hand, when the harrow again assumes its proper position.

We claim as our invention—

The improved harrow, constructed and operating as described.

CORNELIUS THAYER.
LEMAN L. THOMAS.

Witnesses:
JOHN H. NILES,
E. B. YOUMANS.